UNITED STATES PATENT OFFICE.

JOHN KIVETT AND GEORGE KIVETT, OF COVINGTON, KENTUCKY.

IMPROVED METHOD OF LAYING AND SPREADING COMPOSITION ROOFING, PAVEMENT, &c.

Specification forming part of Letters Patent No. 85,453, dated December 29, 1868.

*To all whom it may concern:*

Be it known that we, JOHN KIVETT and GEORGE KIVETT, of Covington, in the county of Kenton and State of Kentucky, have invented a new and useful Improvement in the Process of Laying or Spreading and of Smoothing the Surface of Composition for Roofing and Pavements; and we do hereby declare that the following is a full, clear, and exact description thereof, which will enable others skilled in the art to fully understand and make use of the same.

The nature of this invention consists in the process, hereinafter to be described, of laying or spreading and smoothing the surface of concrete for pavements, roofs, and other purposes.

This concrete or composition may be constituted by combining in certain proportions several common and cheap substances for the purpose of forming a composition especially adapted to the roofs of houses and street-pavements and sidewalks, or floors of cellars, granaries, stables, cattle-yards, and sheds, or other places and buildings.

As a covering for roofs this composition is water-proof, and is unaffected by extremes of cold or heat, neither shrinking nor swelling when exposed to severe frost or the direct rays of the summer sun. It is also fire-proof, and as it does not wash away or disintegrate under the action of water, it makes a very durable covering for a roof.

For pavements, it will bear the heavy pressure of wheels of loaded wagons and the shoes of horses without indentation, and will not wear away rapidly by attrition, but always present a firm and uniform surface at all seasons of the year.

Rats or other vermin will not penetrate or harbor about it, which renders it especially valuable for flooring cellars, granaries, &c.

For roofing purposes the composition is formed of the following ingredients and proportions:

|  | Parts. |
|---|---|
| Screened sand | 80 |
| Asphaltum or hard tar | 10 |
| Brine or salt-water | 10 |
| Composition | 100 |

For pavements the sand is not screened, but the small pebbles it may contain are allowed to remain, and the proportion of sand and pebbles is the same in the composition as of screened sand in the above formula of proportions.

To make the mixture of the ingredients, I employ a suitable iron pot or pan which will bear the direct action of fire, into which vessel I put the screened sand, or sand and pebbles, in the above-named proportion, and thoroughly heat the mass, mixing and stirring in the brine or salt-water in the above proportion, either by hand or machinery, until the whole body of sand is saturated, when the asphaltum or tar, in the above proportion, is also added by pouring, in a hot state, having been previously melted in a separate vessel; and the stirring and mixing of all these substances is continued until a complete union takes place, and the mass assumes the consistency of wet brown sugar, of a dark, glossy appearance.

The composition thus prepared, when used for pavements, is applied when hot by simply laying a coating of from three-quarters of an inch to three inches thick, or more, if desired, for heavy road traffic, upon a solid and smooth bed, and then rolling or packing the composition smooth and solid, for which purpose a heavy cast-iron cylinder, made hot, is the most effective means.

For applying the composition to roofing it is spread hot on felt-paper fastened upon sheathing previously coated with asphaltum.

In constructing streets, sidewalks, and floors of the various kinds of compounds which have been used for that purpose, it has been customary to lay the material in the bed prepared for it in its melted or heated condition, and then to spread it, and smooth its surface with an iron heated for the purpose, or with a cold roller.

Another method frequently adopted has been to form the material into sheets of the required thickness, and lay such sheets in the bed made for their reception, and then unite their edges with a heated iron, which has been termed a "soldering-iron."

It will be apparent that either of the above processes is attended with great inconvenience, and is necessarily expensive.

By our process the material may be placed in its bed and spread as much as is practicable while in its heated condition, when, by the application of the heated roller, the material is spread evenly, and its surface made smooth by passing such roller over it; and thus a large amount of labor and expense is saved, and a better union of the material is made.

The roller used for this purpose may be of various forms of construction. A very good one for the purpose may consist of a cylinder closed at its ends by suitable heads, and having a shaft passing through it to rest in a frame-work which shall surround it. To the shaft may be suspended a pan or reservoir for coal, so arranged as to retain its proper position in the lower portion of the cylinder, but not to rotate with it.

In the pan a fire may be kindled and kept burning, of sufficient intensity to keep the roller heated to a temperature sufficient for the purpose to which it is to be applied.

Access may be had to this pan through an aperture in the head, or any part of the surface of the roller or cylinder, which aperture may be controlled by a door made to close the same.

Oxygen, to support the combustion of the fuel, may be admitted through apertures formed in the ends of the roller.

Having thus described our new process, what we claim, and desire to secure by Letters Patent, is—

The within-described process of spreading and smoothing the surface of concrete or composition for roofs, floors, walks, and streets by the use of a heated roller or rollers, substantially in the manner described.

JOHN KIVETT.
GEO. KIVETT.

Witnesses:
CLINTON BUTTS,
THOMAS DEMPSEY.